United States Patent [19]

Collell et al.

[11] Patent Number: 5,107,331
[45] Date of Patent: Apr. 21, 1992

[54] METHOD AND APPARATUS FOR PRODUCING HALF-TONE SEPARATIONS AT THE SAME SCREEN ANGLE

[75] Inventors: Marcel C. Collell; Vicente S. Trivino, both of Madrid, Spain

[73] Assignee: The Color Group, Richmond, Calif.

[21] Appl. No.: 619,656

[22] Filed: Nov. 27, 1990

Related U.S. Application Data

[63] Continuation-in-part of Ser. No. 320,072, Mar. 7, 1989, abandoned.

[51] Int. Cl.$^5$ .............................................. H04N 1/46
[52] U.S. Cl. ........................................ 358/75; 358/78; 358/456
[58] Field of Search ............. 358/75, 78, 80, 454–459, 358/298

[56] References Cited

U.S. PATENT DOCUMENTS

| | | | |
|---|---|---|---|
| 3,911,480 | 10/1975 | Brucker | 358/75 |
| 4,456,924 | 6/1984 | Rosenfeld | 358/75 |
| 4,507,685 | 3/1985 | Kawamura | 358/78 |
| 4,533,941 | 8/1985 | Keane et al. | 358/78 |
| 4,626,901 | 12/1986 | Tanioka | 358/75 |
| 4,680,625 | 7/1987 | Shoji et al. | 358/80 |
| 4,698,691 | 10/1987 | Suzuki et al. | 358/458 |
| 4,752,822 | 6/1988 | Kawamura | 358/75 |
| 4,768,101 | 8/1988 | Webb | 358/298 |

OTHER PUBLICATIONS

"A Comparison of Staggered Position One Angle Process Color Printing With Four Angle and One Angle Process Color Printing" by Blair Richards, Jr.

Primary Examiner—James J. Groody
Assistant Examiner—Kim Yen Vu
Attorney, Agent, or Firm—Christie, Parker & Hale

[57] ABSTRACT

A metthod of generating a set of half-tone screens for color printing using a digital computer and an x-y plotter, including the steps of generating and storing a separate and unique screen function matrix for each of the half-tone screens, each matrix comprising a set of light intensity level values in increments going from zero to a maximum, the sequence of numbers being a predetermined pattern that is different for each matrix, gnerating and storing a picture matrix of values representing the pixel portions and desired levels of color intensity of each basic color at the positions in the picture to be printed, creating each screen by dividing each screen area into a plurality of cells, each cell being formed as a binary matrix of elemental areas that are selectively either clear or opaque, assigning one of said converted numerical values from each of said basic colors from said set to each of said cells in the corresponding screens being created; and setting the binary values for the elemental areas within a cell by comparing the converted intensity level value for the particular basic color with each of the values in the associated screen function matrix, the binary value for each elemental area being set to one value or the other depending on whether the intensity level value is greater or less than the compared value stored in the cell function matrix. The screens are positioned to superimpose the basic colors over each other in partially overlapping fashion at the same screen angle. The spots of the color screens are shifted rectilinearly from each other.

36 Claims, 9 Drawing Sheets

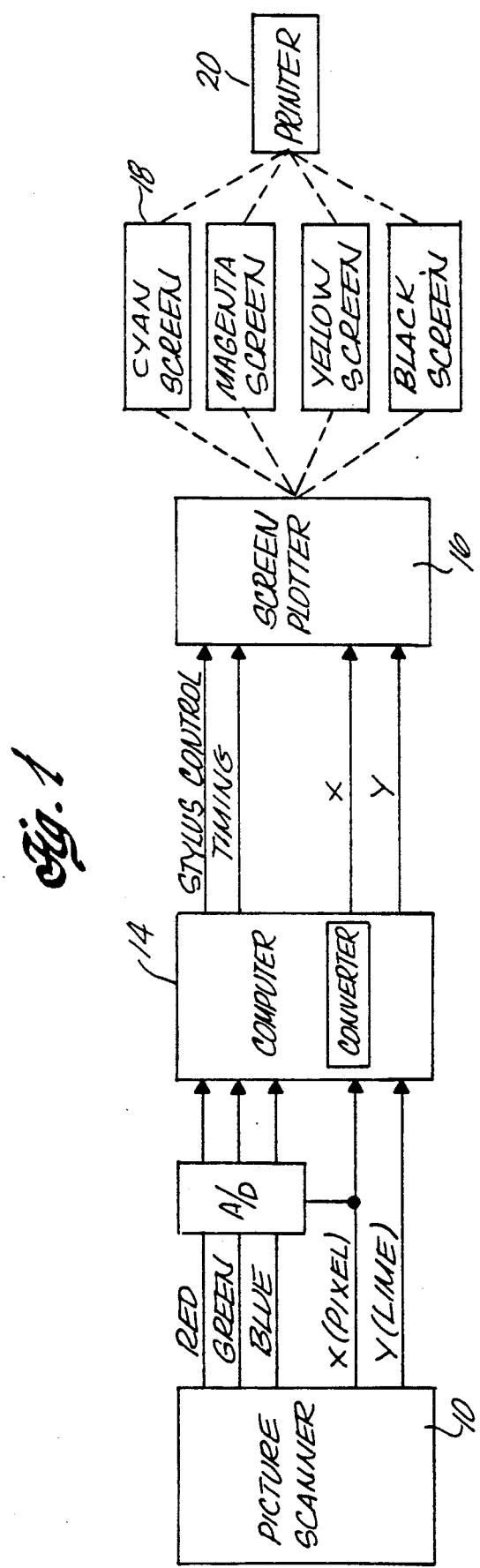

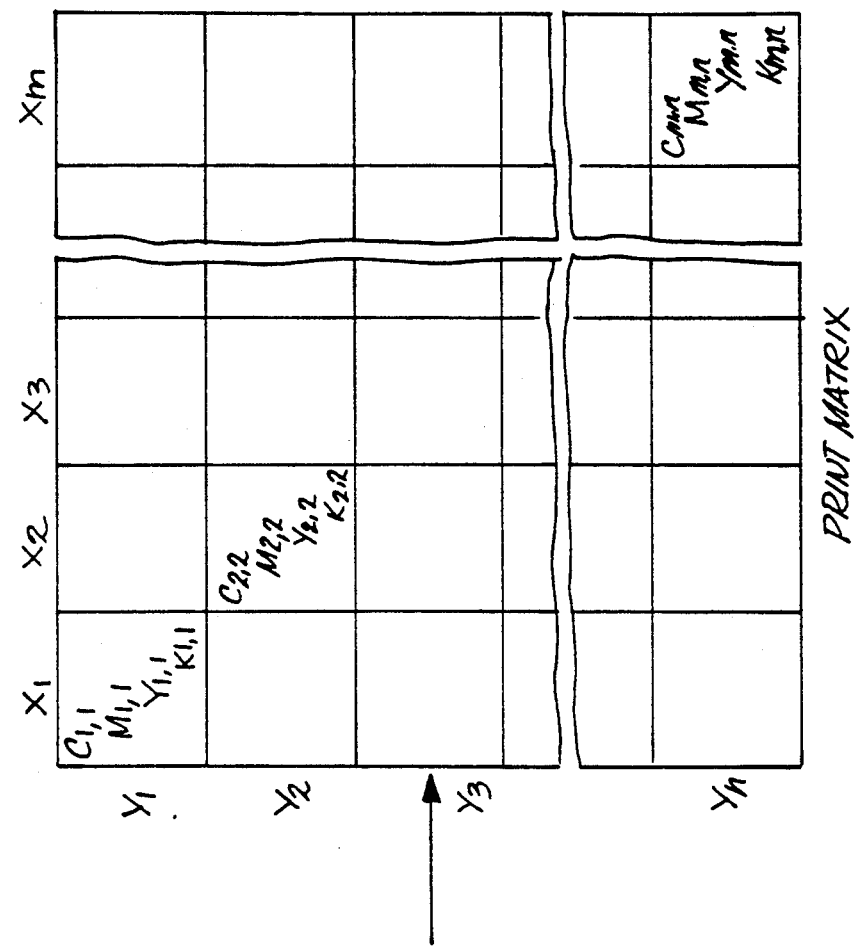
Fig. 3 PRINT MATRIX
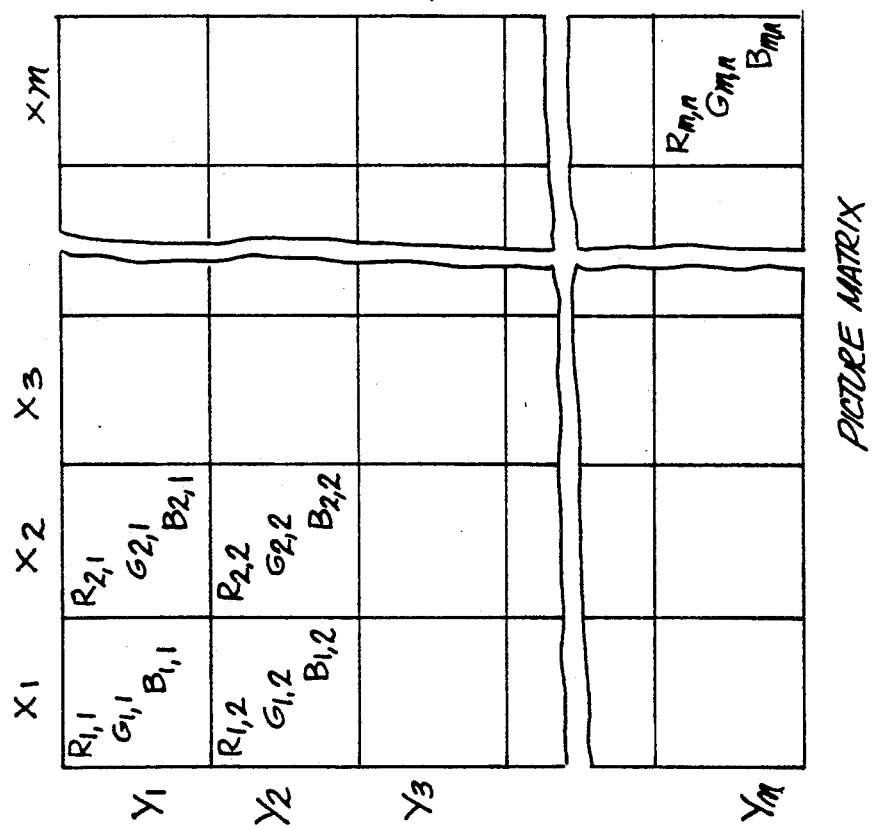
Fig. 2 PICTURE MATRIX

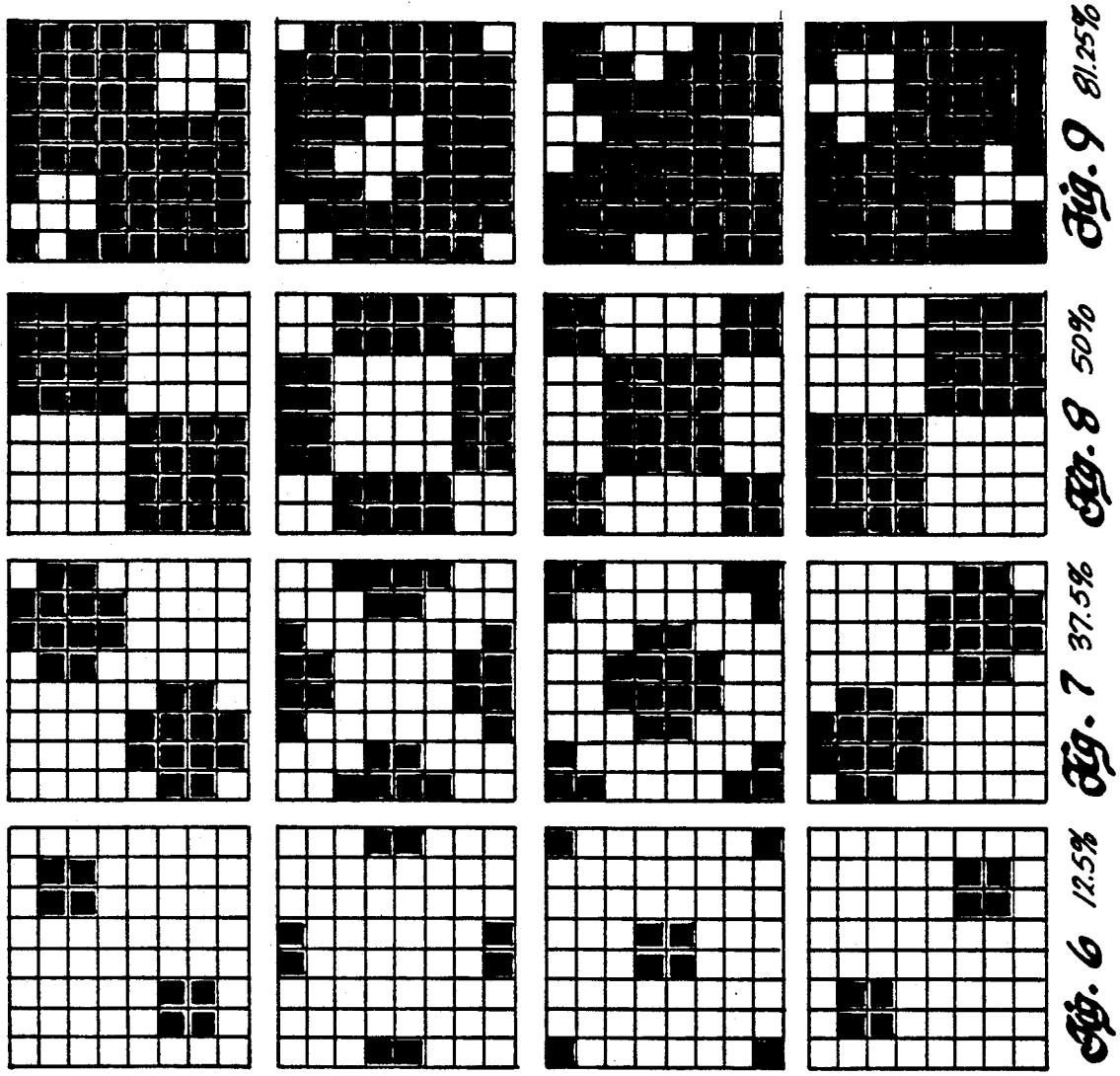
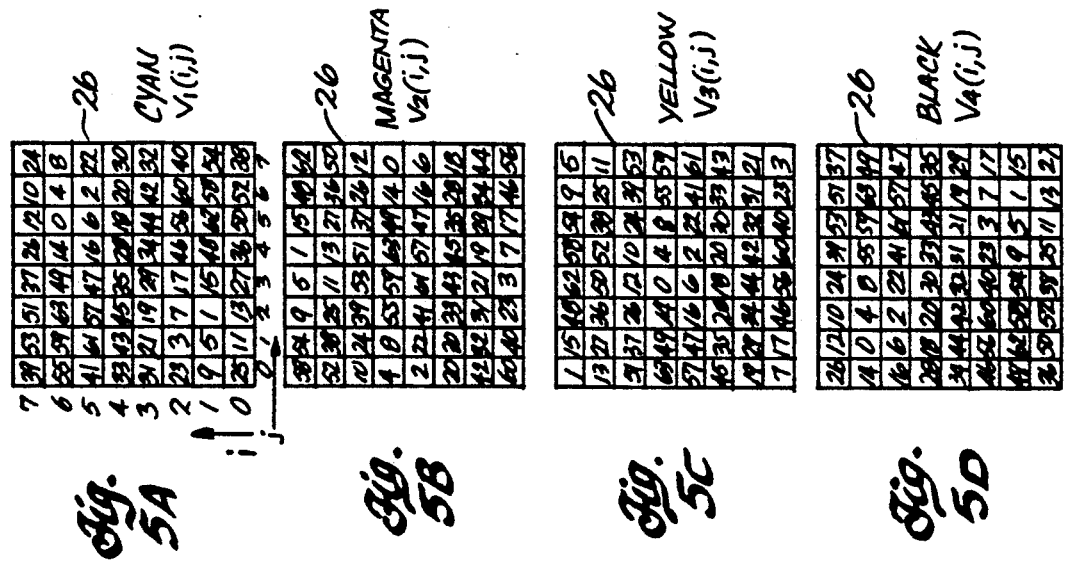

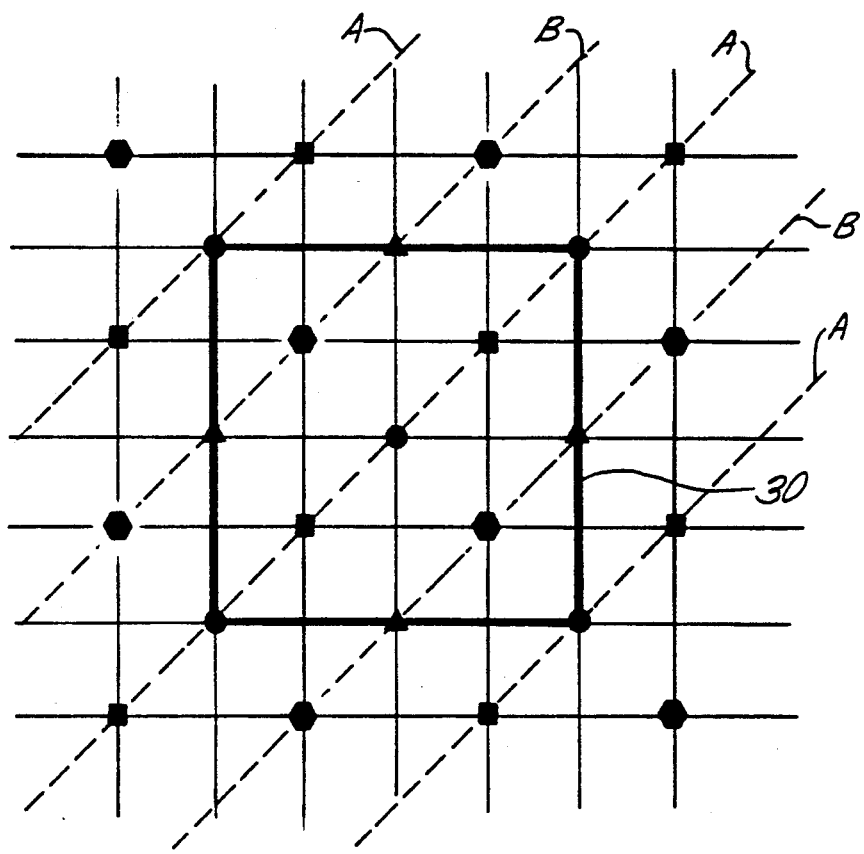

CYAN-12.5%

BLACK—12.5%

YELLOW - 12.5%

MAGENTA - 12.5%

METHOD AND APPARATUS FOR PRODUCING HALF-TONE SEPARATIONS AT THE SAME SCREEN ANGLE

This is a continuation-in-part of application Ser. No. 320,072, filed Mar. 7, 1989, now abandoned.

BACKGROUND OF THE INVENTION

The present invention is directed to a method and apparatus for making color prints and more particularly for making half-tone screens for use in color printing.

In the conventional half-tone color reproduction process, an original color print or transparency is scanned by a photosensitive device that senses the variations in light intensity at each of the three primary color frequencies, namely, red, blue, and green. The average light intensity level for each primary color for each incremental area (pixel) of the scanned original is quantized and stored digitally. Alternatively, the digital values for red, green, and blue could be from other sources, such as by a programmed computer. This data is then processed to convert the values to the equivalent light intensity levels required to produce the same color from the three primary pigment colors, cyan, magenta, and yellow. It is also desirable to introduce a "black" component in addition to the three basic colors in the processed output data.

A set of four screens are produced, using a suitable plotter, from these four sets of values. Each screen, called a half-tone screen, is in the form of a grid. Depending on the printing process, the grid may be in the form of physical openings or in the form of clear areas of a photographic negative. In the half-tone process, the ratio of the area of each opening or clear area to the surrounding opaque area is determined by the required color intensity for the particular pixel of the reproduced image. Each screen is then used to lay down a grid pattern of dots of the associated one of the three primary colors on the color print reproduction. The resulting color print is a reproduction of the original but composed of certain patterns of four dots of varying size. The human eye integrates these dot patterns into the various color tones and detail of the original.

One problem with the superposition of multiple grids is the resulting formation of interference bands or patterns, known as the Moiré effect. This effect is present whenever sets of parallel lines are superimposed at relative angles to each other. Where the sets of lines cross, they reinforce each other, producing dark bands in the picture. To minimize this effect in the color printing half-tone process, one technique is to place the superimposed grids at precise angles relative to each other, namely, 0 degrees for yellow, +15 degrees for cyan, −15 degrees for magenta, and +45 degrees for black. This solution and ways of implementing grid angle control are discussed in U.S. Pat. Nos. 4,456,924 and 4,499,489. One problem with this technique is that a small deviation from these precise angles produces a noticeable Moiré effect. The Moiré effect is also minimized if screens are aligned at the same angle. However, this approach has not been considered practical since, when using the same screen geometry, any slight variation in lateral displacement changes the amount of overlap of the dots and this in turn changes the ratio of white area to color area, resulting in noticeable changes in color reproduction.

SUMMARY OF THE INVENTION

The present invention is directed to an improved method of producing half-tone screens for color reproductions. The screens do not require relative angular rotation to avoid the Moiré effect. Instead, a rectilinear transposition of successive halftone screens is used to produce the color reproduction. The shape and relative position of dots in the different separations are chosen to minimize color shifts due to variations in registration at the printing stage. More accurate conversion from the RGB colors to the cyan, magenta, yellow, and black is possible due to a more regular pattern of superposition. In the past this conversion has required a geometrical analysis that is complex and uses some simplifying assumptions and approximations that introduce some deterioration of color quality. The present invention reduces the computational steps required to process the color data.

These and other advantages of the present invention are achieved, in brief, by first, for example, optically scanning the color original and measuring the light intensity in a sequence of pixel areas for each of the three primary color frequencies, or otherwise deriving color video data such as by graphic computations of a computer. Using a digital computer, the intensity levels for each pixel are then converted into a set of numerical values representing the corresponding intensity levels for each of the basic colors to be printed, for example, cyan, magenta, yellow, and black. A different screen function matrix is generated and stored in the computer memory for each of the four color screens being created for use in the color reproduction. Each screen function matrix comprises at least one set of all possible numerical intensity level values for the associated color. However, the pattern or positioning of the values within each matrix differs for each color in a predetermined manner.

Using a suitable x-y plotter, for example, each screen is created by dividing the screen area into a plurality of cells, each cell corresponding to one half-tone period. Each cell is formed by the plotter as a binary matrix of elemental areas, the plotter creating each elemental area in one of two states, e.g., clear or opaque. The screen function matrices have the same dimensions, i.e., numbers of elements, as the cell matrices, so that each elemental area in a cell has a corresponding intensity level value in the screen function matrix. Each cell of a picture screen is mapped to one or more particular pixel areas of the picture being reproduced. The binary state for each elemental area within a cell is determined by comparing the corresponding intensity level value in the screen function matrix with the stored intensity level values derived from the associated pixel areas. The color reproduction is created from the half-tone screens by positioning the screens during printing to superimpose the color areas of the screens over each other in partially overlapping fashion at the same screen angle. As a result of the arrangement of the screen function matrices, the spot centers of the cells of each screen are shifted rectilinearly with respect to the spot centers of the cells of the other screens.

BRIEF DESCRIPTION OF THE DRAWINGS

For a better understanding of the invention, reference should be made to the accompanying drawings, wherein:

FIG. 1 is a block diagram of an embodiment of the invention;

FIG. 2 is a diagram showing the form of the data generated by the scanner from an original color picture being reproduced;

FIG. 3 is a diagram showing the form of the data after conversion for printing;

FIGS. 5A-D are sets of diagrams showing examples of the four screen function matrices;

FIGS. 6-9 are diagrams of screen cell patterns for each basic color at four different color intensities;

FIG. 10 is a diagram showing the superimposed color positions; and

DETAILED DESCRIPTION

Figure 4:
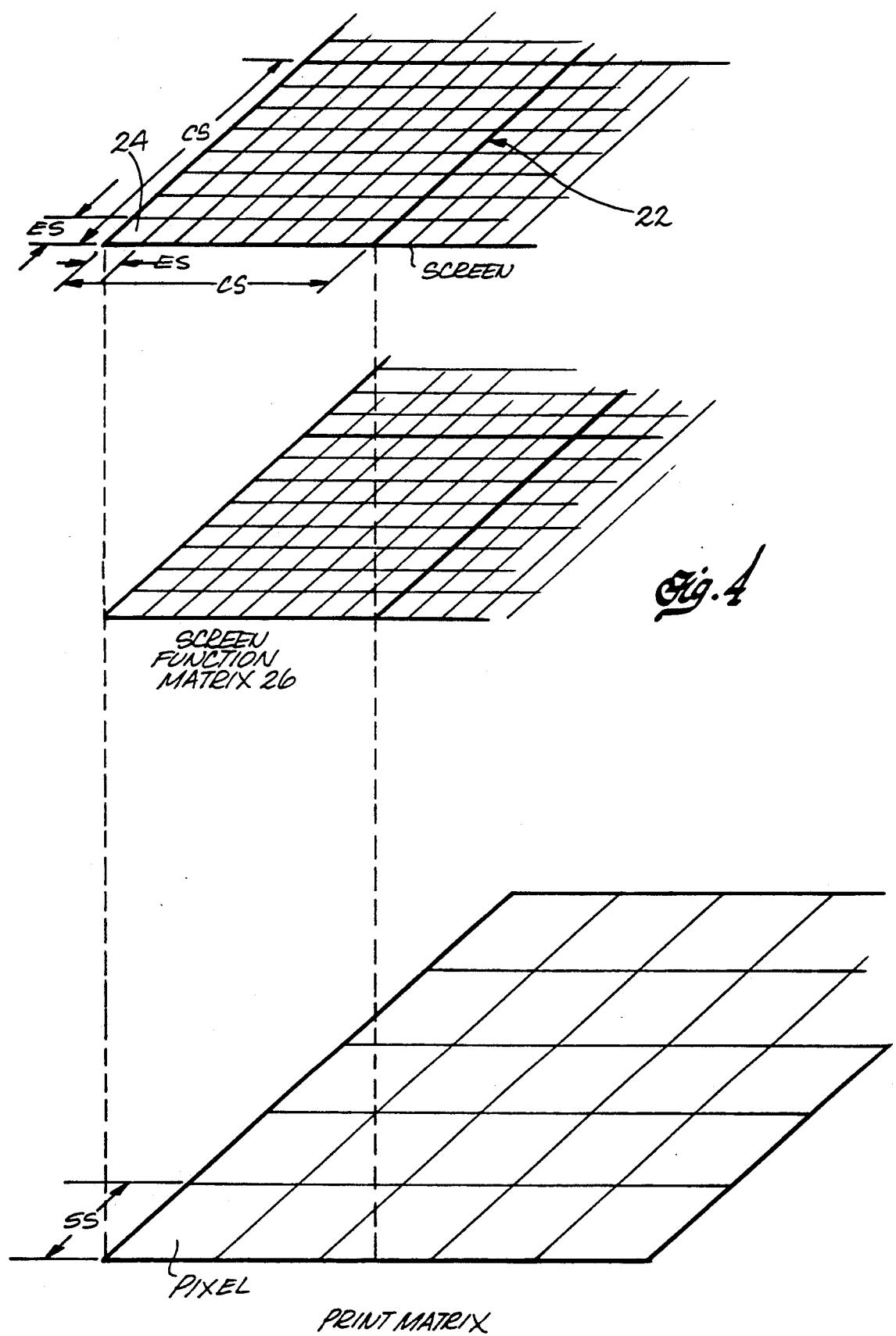
FIG. 4 is a diagram of screen cell as formed by the plotter.
Figure 11:
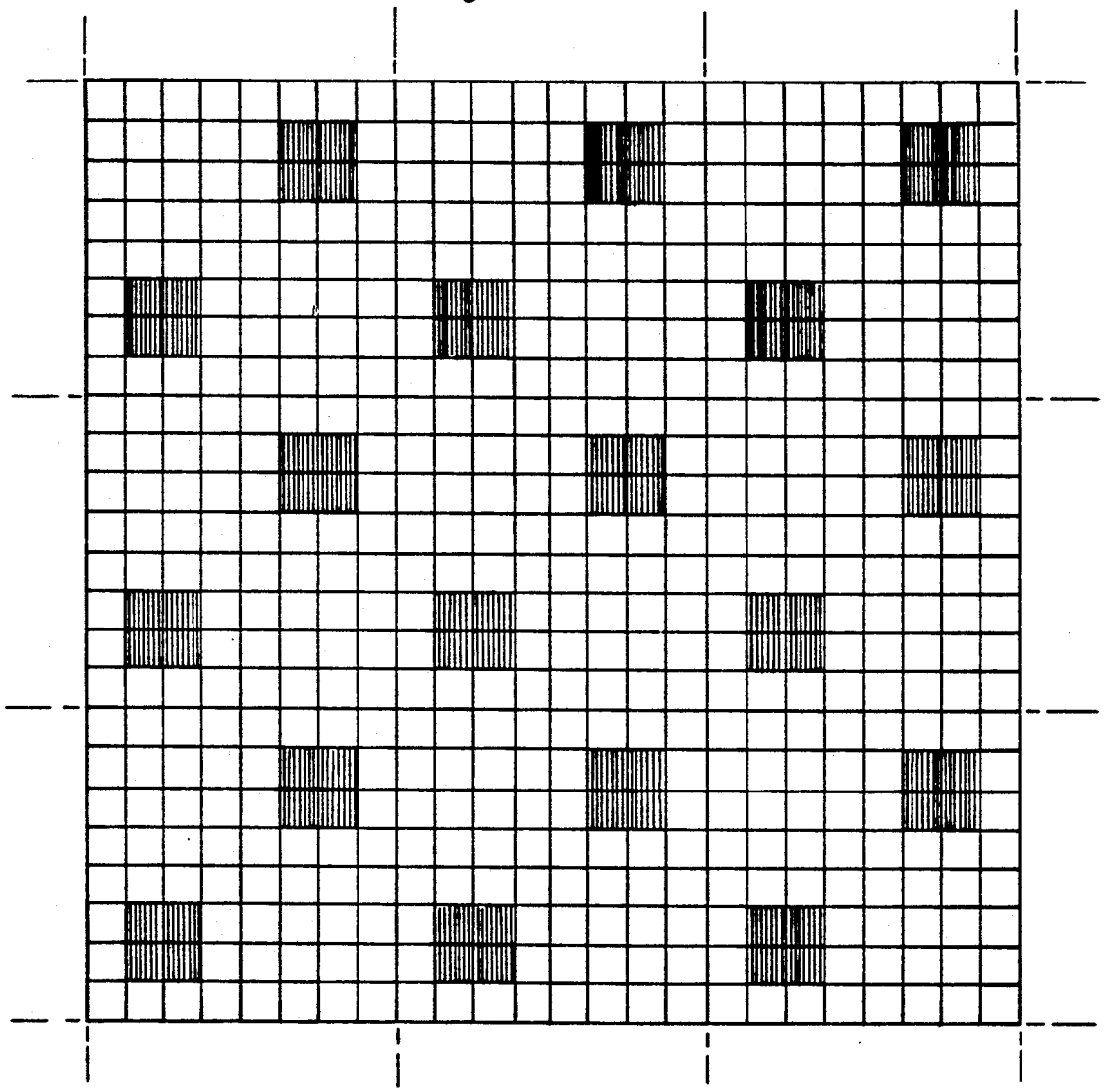
FIGS. 11 through 14 are diagrams of a mosaic of adjacent cells of cyan, black, yellow, and magenta screens, respectively, at a color intensity level of 12.5%.
Figure 12:
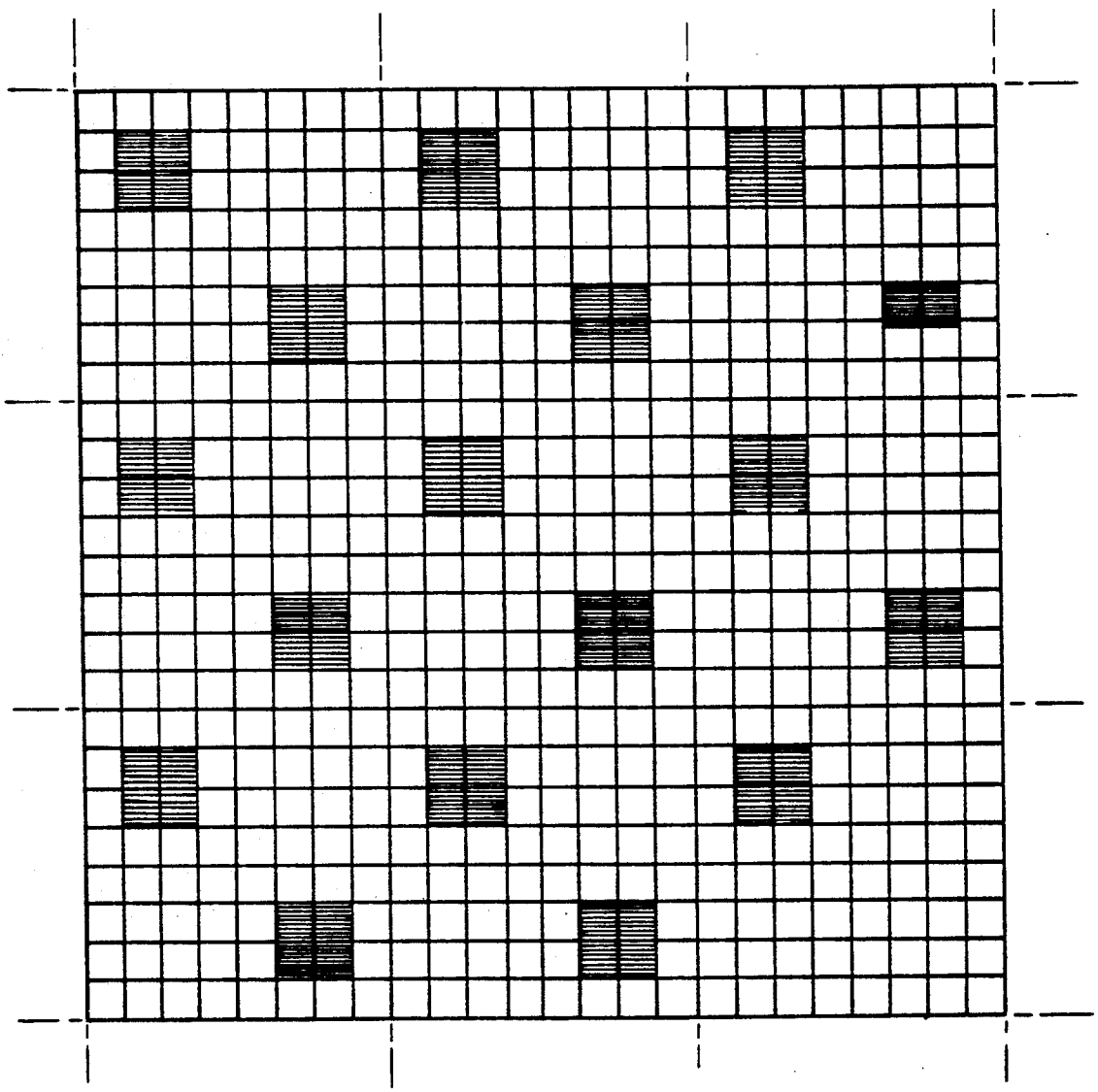
Figure 13:
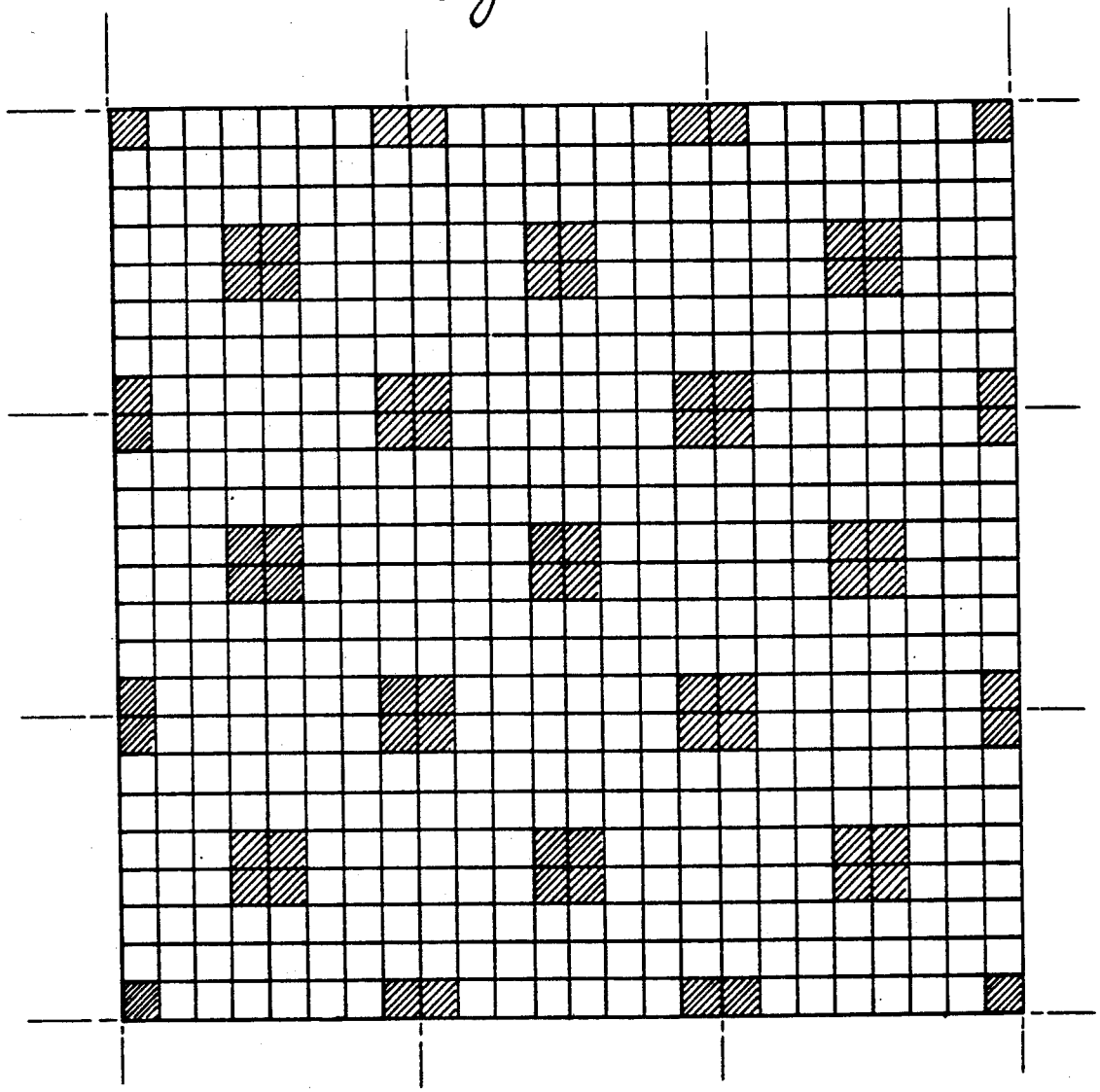
Figure 14:
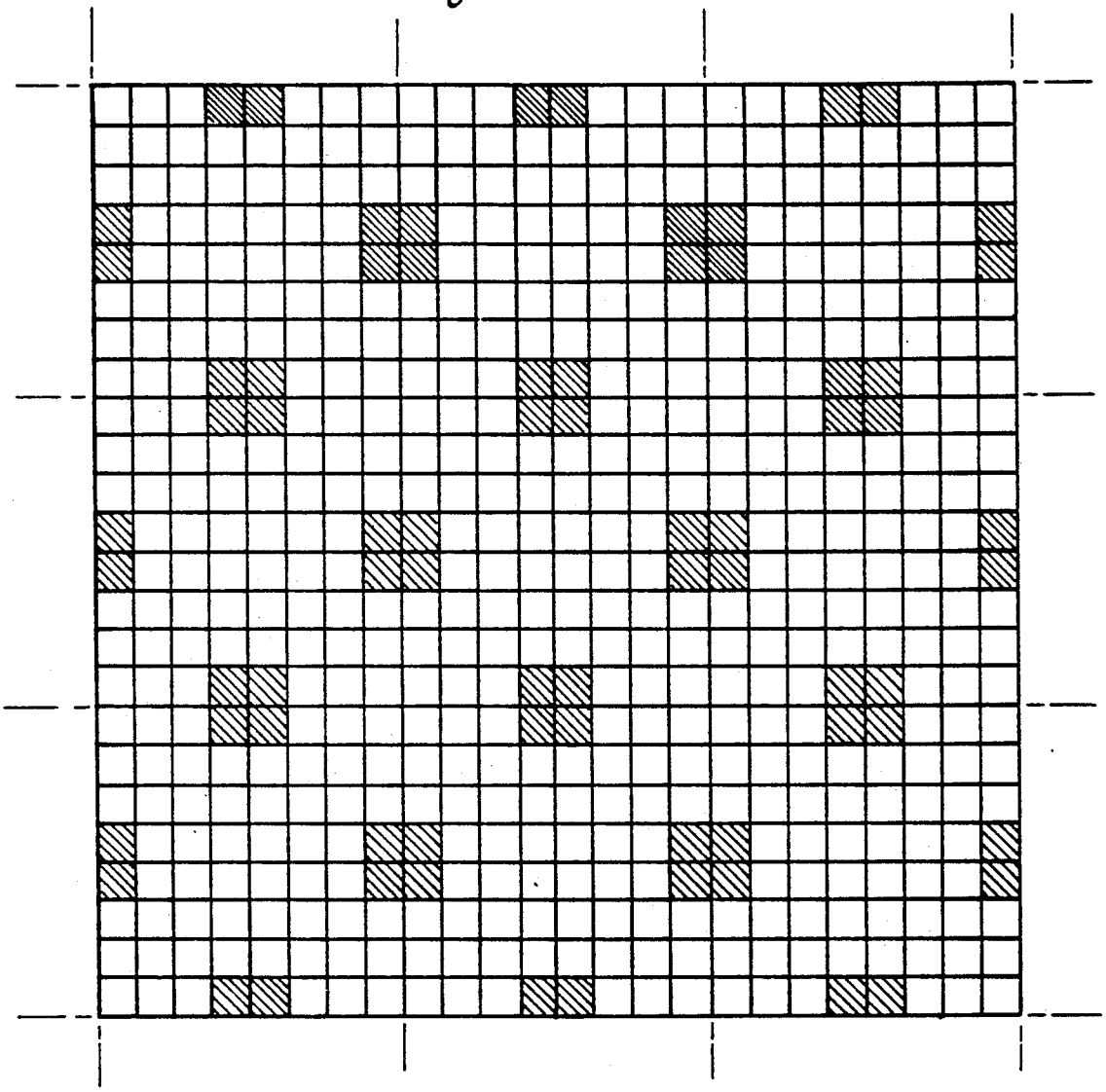

Referring to FIG. 1 in detail, the numeral 10 indicates generally a scanner for receiving the original color picture that is to be reproduced. The original may be a color photograph, for example, either a print or transparency. The scanner may be of any well-known optical scanning device in which the picture is traversed in a raster type pattern by a photosensitive element that detects the level of reflected or transmitted light for each of the primary colors, red, green, and blue. These detected light intensity levels are converted to three electrical analog signals which are connected to an analog-to-digital (A/D) converter 12. In addition the scanner 10 generates two signals x and y which define the pixel position and the scanning line respectively of the scanning element as it moves relative to the picture. The A/D converter 12 is synchronized with the pixel position signal x so that a digital output is generated with each predetermined incremental advance of the scanning element. Thus, the picture is converted by the scanner 10 and A/D converter 12 into a series of picture elements (pixels), the average light intensity in each pixel for each of the three basic colors being a digital value, preferably on a scale of 0 to 1. While a scanner has been shown, the invention is not limited to any particular method of generating the digital color image data. For example, graphical information generated by a computer may be the source of the color image data.

The three digitized red, green, and blue output signals R, G and B, together with x and y position signals, are inputted to a digital computer 14. The computer stores the data in memory as a picture matrix, shown by the diagram of FIG. 2. The positions $X_m, Y_n$ in the stored picture matrix correspond to the pixel positions of the scanned original. The three intensity level values R, G, and B for each pixel are stored in the corresponding position in the picture matrix.

Once the data for the original picture is stored in the picture matrix, the computer processes the data to convert it to an equivalent set of intensity values for the primary printing colors cyan, magenta, and yellow. The mathematics for this conversion process is well known. See for example "Principles of Color Reproduction" by J.A.C. Yule, Wiley & Sons, 1967, Chapters 10 and 11. At the same time a fourth set of values for black are also preferably computed. The resulting data is stored in a print matrix, as shown in FIG. 3, the four intensity level values C, M, Y, and K for each pixel being stored in the corresponding position x, y in the print matrix.

The print matrix data is used by the computer to provide control information to a plotter 16 which creates the four half-tone screens 18 required to make the color prints. The plotter is a conventional high resolution x-y plotter. Depending on the type of screen, the plotter printing element or stylus may be a laser beam, an ink jet, or other device capable of producing, on command, a contrasting dot in an elemental area on whatever medium the screen is being formed. The stylus can be positioned by x-y coordinate digital input signals at any selected incremental area within the plotting range. The screens may take a variety of forms depending on the particular printing process employed, such as a photographic negative. Once created, the screens are used in a conventional printer 20 to produce a color image on display surfaces such as sheets of paper or photographic color prints.

The command signal for the stylus and the position control signals for the plotter are produced by the computer in the following manner. Referring to FIG. 4, the screen 18 being created is divided logically into cells 22, each cell corresponding to one half-tone period of the screen. The cell size (CS) depends on the definition of the printing process. For example, printing on newsprint provides relatively poor definition and therefore the size of a cell can be relatively large. The cell size is also limited by the elemental size (ES) of the plotter stylus. The more plotter dots within a cell, the better the color range of the reproduced prints. If the cell size is the same as the size of an elemental area (element size), for example, no half-tones can be reproduced. Preferably the cell size should be at least eight times the elemental area so that one cell includes sixty-four elemental areas. A plotter dot or elemental area, indicated at 24, has a physical dimension ES that is fixed by the minimum spacing resolution of the particular plotter used. The cell size CS is an integral multiple n of the plotter elemental area size ES. Each cell therefore consists of an n×n binary matrix of elemental areas or plotter dots 24. In the example shown, n=8.

According to the present invention, the plotter is controlled by the computer to lay down a unique pattern of dots within each cell for each of the four half-tone screens needed to print a reproduction. The pattern varies from cell to cell to satisfy the half-tone or color intensity level requirement of each cell. At the same time the patterns are designed to minimize overlap of individual colors when the screens are superimposed. To this end, the computer stores a set of four screen function matrices 26. The dimensions of these matrices correspond to the dimensions of the cell matrix, namely, an n×n matrix. Each position in the screen function matrices, therefore, has a corresponding plotter dot (elemental area) position 24 in a cell. The computer stores a different value at each position in a screen function matrix, taken from a set of values representing all the levels of color intensity on a scale of 0 to 1. The number of increments into which the intensity scale is divided is equal to the number of positions in the matrix, namely, n×n. Referring to FIGS. 5A-D, four screen function matrices 26 are shown by way of example, one for each of the four basic colors, cyan, magenta, yellow, and black. In the figures, the numbers of the positions of each increment on the intensity scale are shown in place of the actual intensity level values.

Once the screen function matrices are computed and stored, the computer controls the plotter to advance the stylus from one elemental area to the next in a predetermined sequence. At each position, the computer issues a binary control signal to the stylus to either activate the stylus or not. The binary control signal is set by comparing the required color intensity level value for the particular half-tone period or cell as derived from the print matrix (see FIG. 3), with the intensity level value stored in the screen function matrix for the particular stylus position (elemental area) within the cell. For example, only if the required color intensity level is greater than the value derived from the screen function matrix will the computer activate the stylus to form a dot (or not activate the stylus depending on the particular printing process). FIGS. 6–9 show the plotted dots in a cell for each color at four different levels of color intensity.

Every cell has at least one pixel of the scanned original, as stored in the computer, associated with it. There does not have to be any one-to-one correspondence between the pixels and the cells, although this special case simplifies an understanding of the invention. Mapping between the pixels and the cells is controlled by the computer so that a pixel color intensity level value is assigned to each elemental area of the plotter. The same pixel value need not be assigned to every elemental area within a cell. Thus the mapping may vary depending on the relative size of the printed picture relative to the size of the original. For example, if a large magnification of picture size is required, it is obvious that a single pixel of the original picture may be used to control the color intensity of a number of cells or half-tone periods. The number of pixels generated by the scanning process is to a degree independent of the number of cells in the printing process, the number of pixels being determined by the size (SS) of each pixel relative to the size of the original being scanned. Thus, as shown in FIG. 4, the cell boundaries do not necessarily coincide with the pixel boundaries, so that one cell may involve the intensity values from more than one of a group of adjacent pixels or one cell may involve the intensity values from one pixel with a rectilinear shift between pixel boundaries and cell boundaries. Alternatively, the intensity value of a single pixel may be used to control the plotter in more than one cell.

Referring again to FIG. 5, a set of screen function matrices for the four colors, cyan, magenta, yellow, and black, is shown for a cell formed, for example, as an 8×8 binary matrix of plotter elemental areas. As noted, the dimensions of the binary matrix are fixed by the ratio of the required cell size to the size of the elemental area produced by the particular plotter. The intensity level numbers stored in each matrix are arranged in a predetermined pattern of positions which produce unique color patterns in the screen cells. The predetermined positional patterns are different for each matrix, as illustrated in FIGS. 5A through 5D. FIGS. 6–9 illustrate the color patterns generated for each of the four colors at each of four color intensity levels, namely, at 12.5%, 37.5%, 50% and 81.8% color intensity, respectively.

The relationship between the screen function matrices for the four colors may be expressed as follows. Let $V_1(i,j)$ be the basic matrix for cyan, with $i,j=0,1,...n$. Assuming n is an integral multiple of four, then (black) $V_4(i,j) = V_1(i, (j+n/2) \mod n)$ (magenta) $V_2(i,j) = V_1((i+n/4) \mod n, (j+n/4) \mod n)$ (yellow) $V_3(i,j) = V_2(i, (j+n/2) \mod n)$ where "mod n" stands for modulo n. If n is not a multiple of four, analogous transformations become more complex in their mathematical definitions.

A significant aspect of the present invention is that not only do the screen function matrices produce different patterns for each color, each cell for each color has two distinct and separate color areas, i.e., spots and these two color areas are located differently for each of the four colors. In the preferred embodiment shown, the arrangement of numbers in the screen function matrix shown in FIG. 5A for the color cyan produces two color areas in a screen cell (see FIGS. 6–9) that are approximately centered in two diagonal quadrants of the cell, while the arrangement of numbers in the screen function matrix shown in FIG. 5D for black produces two color areas approximately centered in the other two diagonal quadrants of the cell. The numbers in the function screen matrices for magenta and yellow respectively approximately center two color areas respectively at the centers of two adjacent boundaries of the cell, and at the center and one corner of the cell. To produce the half-tone color image, printer 20 positions the four screens 18 in registration with each other vis-a-vis the display surface, e.g., sheet of paper or photographic color print film. Accordingly, the individual elements and corresponding cells of all four screens and, thus, the screen function matrices of all four colors, are aligned with each other as their color separation images are transferred to the display surface. For example, in the screen function matrices, position 25 in FIG. 5A corresponds to position 60 in FIG. 5B, position 7 in FIG. 5C, and position 36 in FIG. 5D. In other words, the screens are all positioned during printing so the color areas thereof are superimposed on the display surface at the same angle to produce the four color, half-tone image, and the color areas appear on the display surface in partially overlapping fashion, i.e., the color areas produced by the different screens overlap at large color intensity levels. When the color areas produced by the screens are superimposed, the centers of the color areas for all four basic colors are arranged in the pattern shown in FIG. 10. The centers of the two color areas are called hereafter "spot centers" because as the color intensity level increases, the spots grow in size from the centers until they eventually merge to form a single spot above a 50% color intensity level. As illustrated, the spot centers are arranged in non-overlapping fashion as far as possible from each other to minimize the overlap of the superimposed colors at higher color intensity levels; the vertical and horizontal distance between adjacent spot centers is less than the diagonal distance between spot centers. The spot centers for cyan, magenta, yellow, and black are represented in the drawing, respectively, as squares, triangles, circles, and hexagons to distinguish them from each other. As used herein, the term "dot" refers to one colored elemental area. In this sense, the cell patterns of FIGS. 6 to 9 are made up of dots. The term "spot" refers to the collection of contiguous dots that form a color screen pixel.

It will be noted that, with increasing color intensity, the pattern of numbers in the screen function matrices produces expanding areas of color in the cells by causing additional contiguous elemental areas to be added to each of the two color areas. In the case of magenta and yellow, because the color areas are centered on the boundary of the cell, the color areas expand into the adjacent cells so more than two color areas lie within the boundaries of the cell. FIG. 10 shows a mosaic of cells of the four superimposed screens, and the boundaries of one of the cells within a square outline 30. The center of the color areas for cyan and yellow are located at equally-spaced interspersed positions along a first diagonal A, while centers of the color areas for magenta and black are located at equally-spaced interspersed positions along a second parallel diagonal B parallel. Diagonals A and B are equally spaced throughout the superimposed screens. (The centers of the color areas could also be viewed as being located along parallel diagonals that are orthogonal to diagonals A and B.) This arrangement insures the maximum spacing and minimum overlap between the color spots produced by the four screens. While a diagonal orientation, i.e., 45 degrees to the horizontal of the color dots is preferred for best visual results, arrangement for the lines A and B at other angles is equally possible. In any case, the screens are positioned during printing so the spots on the display surface transferred from the four screens are superimposed on each other at the same angle and the spot centers of all the colors are therefore arranged at the same angle, as illustrated in FIG. 10. In the preceding discussion, the primary printing colors have been assigned to specific screen matrices by way of example. In practice, this assignment can be arbitrarily changed.

FIGS. 11 through 15 represent a mosaic of adjacent cells of cyan, black, yellow, and magenta screens, respectively, at a color intensity level of 12.5%. As illustrated, all the spots for magenta and half the spots for yellow cross cell boundaries. By comparing the cell boundaries in FIGS. 11 and 12, it is apparent that, in effect, the spot centers of the black screen are shifted horizontally 50% from the cell spacing relative to the spot centers of the cyan screen. (Alternatively, they can be viewed as shifted vertically 50%.) By comparing the cell boundaries in FIGS. 12 and 13, it is apparent that, in effect, the spot centers of the yellow screen are shifted horizontally 25% and vertically 25% for the cell spacing relative to the spot centers of the black screen. By comparing the cell boundaries in FIGS. 12 and 14, it is apparent that, in effect, the spot centers of the magenta screen are shifted horizontally 25% and vertically 25% from the cell spacing relative to the spot centers of the black screen, but in the opposite direction from the yellow screen. By comparing the cell boundaries in FIGS. 13 and 14, it is apparent that, in effect, the spot centers of the magenta screen are shifted horizontally 50% from the cell spacing relative to the spot centers of the yellow screen. (Alternatively, they can e viewed as shifted vertically 50%).

Attached hereto as Appendix A is a source code listing of a program in "C" language and as Appendix B a source code listing of a program in POSTSCRIPT language for execuation with POSTSCRIPT that may be installed in computer 14 to perform the described operations.

```
/******Source code for "C" implementation of Anaya/ColorGroup dots******/
/****Includes random fluctuation extension of the basic dots***/ include <math.h>
include <stddef.h>
#include "Dot Anaya 1.0.h"
#include "nrmatrix.h"

void ShiftMatrixLeft(Ti, Tu, DimV, DimH, n)
int **Ti;
int **Tu;
int DimV, DimH;
int n;

{
int i, j;

for (i = 0; i < DimV; i++)
 for (j = 0; j < DimH; j++)
  if (j < DimH - n)
   Tu[i][j] = Ti[i][j + n];
 else
  Tu[i][j] = Ti[i][j - (DimH - n)];
}
```

APPENDIX A

```
void ShiftMatrixRight(Ti, Tu, DimV, DimH, n)
int  **Ti;
int  **Tu;
int DimV, DimH;
int n;

{
 int i, j;

for (i = 0; i < DimV; i++)
  for (j = 0; j < DimH; j++)
   if (j < n)
    Tu[i][j] = Ti[i][j + (DimH - n)];
   else
    Tu[i][j] = Ti[i][j - n];
} void ShiftMatrixUp(Ti, Tu, DimV, DimH, n)
int  **Ti;
int  **Tu;
int DimV, DimH;
int n;

{
 int i, j, DimV4;

for (i = 0; i < DimV; i++)
  for (j = 0; j < DimH; j++)
   if (i < n)
    Tu[i][j] = Ti[i + DimV - n][j];
   else
    Tu[i][j] = Ti[i - n][j];
} void ShiftMatrixDown(Ti, Tu, DimV, DimH, n)
int  **Ti;
int  **Tu;
int DimV, DimH;
int n;

{
 int i, j, DimV4;

for (i = 0; i < DimV; i++)
  for (j = 0; j < DimH; j++)
   if (i < DimV - n)
    Tu[i][j] = Ti[i + n][j];
```

```
else
 Tu[i][j] = Ti[i - (DimV - n)][j];
} int CalculaDimMatrix(LinEfectiva, ResH, ResV, DimH, DimV)
double LinEfectiva;
int ResH, ResV;
int *DimH, *DimV;
{
 double Lr;

Lr = (LinEfectiva) / sqrt(2.0);

*DimH = ceil(ResH / (Lr * 2));

*DimV = ceil(ResV / (Lr * 2));
} int **CalculaCuadranteRoundDot(LinEfectiva, ResH, ResV, DimH, DimV)
double LinEfectiva;
int ResH, ResV;
int *DimH, *DimV;
{
 double Lr;
 double IncV, IncH;
 double i, j;
 double **Cuad;
 int K, V, PosK, PosV, ii, jj, Max;
 int **Matriz;

Lr = (LinEfectiva * 2) / sqrt(2.0);

*DimH = ceil(ResH / Lr);
 *DimV = ceil(ResV / Lr);

IncV = 2.0 / *DimV;
 IncH = 2.0 / *DimH;

Cuad = dmatrix(0, *DimV - 1, 0, *DimH - 1);
 Matriz = imatrix(0, (*DimV) * 2 - 1, 0, (*DimH) * 2 - 1);

i = -1.0 + IncV / 2;
 for (K = *DimV - 1; K >= 0; K--)
  {
  j = -1.0 + IncH / 2;
  for (V = 0; V < *DimH; V++)
   {
   Cuad[K][V] = 1 - (i * i + j * j);
    j += IncH;
    }
```

```
    i += IncV;
}
for (K = 0; K < *DimV; K++)
 for (V = 0; V < *DimH; V++)
  Matriz[K][V] = *DimV * (*DimH) - 1 - (int)ceil((Cuad[K][V]
          +    1.0)
             *
             ((*DimV  *   (*DimH)
             -  1)  /   2.0));

free_dmatrix(Cuad, 1, *DimV, 1, *DimH);
 return(Matriz);
}

/* double dot, 4 directions alternative growth (asume punto redondo jj+=2) */
void CalculaMatrizAnaya(CuadEnt, TempM, DimH, DimV)
int **CuadEnt, **TempM;
int DimH, DimV;
{
 int K, V, PosK, ii, jj, Max;

ii = 0;
 Max = DimH * DimV * 4 - 1;
 for (jj = 0; jj < DimH * DimV; jj += (jj > 0) ? 2 : (DimV % 2) ? 1 : 2)
  {
   do
   {
   /*   top   izq   ->   der        */
   PosK = 1;
   K = 0;
     do
     {
     V = 0;
      do
      {
       if (CuadEnt[K][V] == jj)
        {
         CuadEnt[K][V] = -1;
         TempM[K][V + DimV] = ii++;
         TempM[K + DimH][V] = ii++;
         TempM[K][V] = Max - TempM[K][V + DimV];
         TempM[K + DimH][V + DimV] = Max - TempM[K + DimH][V];
         PosK = 0;
        }
      }
     while(PosK && ++V < DimH);
     }
    while(PosK && ++K < DimV);

/*   right   arr   ->   aba        */
   if (PosK == 0)
```

```
{
PosK = 1;
V = DimH - 1;
  do
  {
 K = 0;
   do
   {
  if (CuadEnt[K][V] == jj)
     {
   CuadEnt[K][V] = -1;
   TempM[K][V + DimV] = ii++;
   TempM[K + DimH][V] = ii++;
   TempM[K][V] = Max - TempM[K][V + DimV];
   TempM[K + DimH][V + DimV] = Max
   - TempM[K + DimH][V];
    PosK = 0;
     }
   }
  while(PosK && ++K < DimV);
   }
 while(PosK && --V >= 0);
 }
/* bottom  der  ->  izq      */
if (PosK == 0)
  {
 PosK = 1;
 K = DimV - 1;
   do
   {
  V = DimH - 1;
    do
    {
   if (CuadEnt[K][V] == jj)
      {
    CuadEnt[K][V] = -1;
    TempM[K][V + DimV] = ii++;
    TempM[K + DimH][V] = ii++;
    TempM[K][V] = Max - TempM[K][V + DimV];
    TempM[K + DimH][V + DimV] = Max
    - TempM[K + DimH][V];
     PosK = 0;
      }
    }
   .while(PosK && --V >= 0);
    }
   while(PosK && --K >= 0);
   }

/* left  aba  ->  arr       */
 if (PosK == 0)
```

```
    {
    PosK = 1;
    V = 0;
      do
       {
      K = DimV - 1;
        do
         {
        if (CuadEnt[K][V] == jj)
          {
          CuadEnt[K][V] = -1;
          TempM[K][V + DimV] = ii++;
          TempM[K + DimH][V] = ii++;
          TempM[K][V] = Max - TempM[K][V + DimV];
          TempM[K + DimH][V + DimV] = Max
           - TempM[K + DimH][V];
          PosK = 0;
           }
         }
       while(PosK && --K >= 0);
       }
     while(PosK && ++V < DimH);
       }
     }
    while(!PosK);
     }
 }

/* double dot, raster growth (asume punto redondo jj+=2)    */
void CalculaMatrizAnaya2(CuadEnt, TempM, DimH, DimV)
register int **CuadEnt, **TempM;
register int DimH, DimV;
{
 register int K, V, ii, jj, Max;
ii = 0;
Max = DimH * DimV * 4 - 1;
for (jj = 0; jj < DimH * DimV; jj += (jj > 0) ? 2 : (DimV % 2) ? 1 : 2)
 {
 /*   top   izq   ->   der         */
 K = 0;
  do
   {
   V = 0;
    do
     {
    if (CuadEnt[K][V] == jj)
      {
      CuadEnt[K][V] = -1;
      TempM[K][V + DimV] = ii++;
      TempM[K + DimH][V] = ii++;
      TempM[K][V] = Max - TempM[K][V + DimV];
```

```
        TempM[K + DimH][V + DimV] = Max - TempM[K + DimH][V];
       }
     }
   while(++V < DimH);
    }
  while(++K < DimV);
   }
}

/*single dot, 4 directions alternative growth (asume punto redondo jj+=2) */
void CalculaRoundDot(CuadEnt, TempM, DimH, DimV)
register int **CuadEnt;
register int **TempM;
register int DimH;
register int DimV;
{
 register int K;
 register int V;
 register int jj;
 register int PosK;
 register int ii;

ii = 0;
for (jj = 0; jj < DimH * DimV; jj += (jj > 0) ? 2 : (DimV % 2) ? 1 : 2)
  {
   do
   {
/*  .top  izq  ->   der        */
PosK = 1;
K = 0;
  do
   {
V = 0;
   do
    {
  if (CuadEnt[K][V] == jj)
     {
   CuadEnt[K][V] = -1;
   TempM[K][V] = ii++;
   PosK = 0;
     }
    }
  while(PosK && ++V < DimH);
    }
while(PosK && ++K < DimV);

/*  .right  arr  ->   aba        */
if (PosK == 0)
   {
  PosK = 1;
  V = DimH - 1;
```

```
       do
         {
       K  =  0;
         do
           {
         if  (CuadEnt[K][V]  ==  jj)
             {
             CuadEnt[K][V]  =  -1;
             TempM[K][V]  =  ii++;
             PosK  =  0;
             }
           }
         while(PosK  &&  ++K  <  DimV);
         }
       while(PosK  &&  --V  >=  0);
       }

/*   bottom   der   ->   izq      */
    if  (PosK  ==  0)
       {
       PosK  =  1;
       K  =  DimV  -  1;
         do
           {
         V  =  DimH  -  1;
           do
             {
           if  (CuadEnt[K][V]  ==  jj)
               {
               CuadEnt[K][V]  =  -1;
               TempM[K][V]  =  ii++;
               PosK  =  0;
               }
             }
           while(PosK  &&  --V  >=  0);
           }
       while(PosK  &&  --K  >=  0);
       }

/*   left   aba   ->   arr      */
    if  (PosK  ==  0)
       {
       PosK  =  1;
       V  =  0;
         do
           {
         K  =  DimV  -  1;
           do
             {
           if  (CuadEnt[K][V]  ==  jj)
```

```c
        {
    CuadEnt[K][V] = -1;
    TempM[K][V] = ii++;
    PosK = 0;
        }
      }
  while(PosK && --K >= 0);
    }
  while(PosK && ++V < DimH);
  }
 } while(!PosK);
   }
 }

/*single dot, raster growth (asume punto redondo jj+=2)   */
void CalculaRoundDot2(CuadEnt, TempM, DimH, DimV)
register int **CuadEnt;
register int **TempM;
register int DimH;
register int DimV;
{
 register int K;
 register int V;
 register int jj;
 register int ii;

ii = 0;

for (jj = 0; jj < DimH * DimV; jj += (jj > 0) ? 2 : (DimV % 2) ? 1 : 2)
   {
   /*  top,  izq  ->  der         */
   K = 0;
    do
     {
    V = 0;
      do
       {
     if (CuadEnt[K][V] == jj)
       {
      CuadEnt[K][V] = -1;
      TempM[K][V] = ii++;
        }
      }
    while(++V < DimH);
     }
    while(++K < DimV);
    }
 }
```

```c
void CalculaCuadranteRoundDot2(Matriz, DimH, DimV)
int **Matriz;
int DimH, DimV;
{
double IncV, IncH;
double i, j;
double **Cuad;
int K, V, PosK, PosV;

IncV = 2.0 / DimV;
IncH = 2.0 / DimH;

Cuad = dmatrix(0, DimV - 1, 0, DimH - 1);

i = -1.0 + IncV / 2;
for (K = DimV - 1; K >= 0; K--)
 {
 j = -1.0 + IncH / 2;
 for (V = 0; V < DimH; V++)
   {
   Cuad[K][V] = 1 - (i * i + j * j);
   j += IncH;
   }
 i += IncV;
 }
for (K = 0; K < DimV; K++)
 for (V = 0; V < DimH; V++)
   Matriz[K][V] = DimV * (DimH) - 1 - (int)ceil((Cuad[K][V] + 1.0)
            *  (
            (DimV  *  (DimH)
            -  1)  /  2.0));

free_dmatrix(Cuad, 0, DimV - 1, 0, DimH - 1);
}

Point **dotmatrix(nr1, nrh, nc1, nch)
int nr1, nrh, nc1, nch;
{
 int i;
 Point **m;

m = (Point * *)malloc((size_t)((nrh - nr1 + 1) * sizeof(Point *)));
 if (!m)
  nrerror("error de memoria 1 en matrix()");
 m -= nr1;

for (i = nr1; i <= nrh; i++)
```

```c
{
 m[i] = (Point *)malloc((size_t)((nch - nc1 + 1) * sizeof(Point)));
 if (!m[i])
  nrerror("error de memoria 2 en matrix()");
 m[i] -= nc1;
 }
 return m;
} void free_dotmatrix(m, nr1, nrh, nc1, nch)
Point **m;
int nr1, nrh, nc1, nch;
{
 int i;

for (i = nrh; i >= nr1; i--)
  free((char *)(m[i] + nc1));
 free((char *)(m + nr1));
} char **charmatrix(nr1, nrh, nc1, nch)
int nr1, nrh, nc1, nch;
{
 int i;
 char **m;

m = (char **)malloc((size_t)((nrh - nr1 + 1) * sizeof(char *)));
 if (!m)
  nrerror("error de memoria 1 en matrix()");
 m -= nr1;

for (i = nr1; i <= nrh; i++)
  {
  m[i] = (char *)malloc(((size_t)(nch - nc1 + 1) * sizeof(char)));
  if (!m[i])
   nrerror("error de memoria 2 en matrix()");
  m[i] -= nc1;
  }
 return m;
} void free_charmatrix(m, nr1, nrh, nc1, nch)
char **m;
int nr1, nrh, nc1, nch;
{
 int i;

for (i = nrh; i >= nr1; i--)
  free((char *)(m[i] + nc1));
 free((char *)(m + nr1));
}
```

```
void AsignaOrden(PosDot, Ord, DimV, DimH)
int **PosDot;
Point *Ord;
int DimV;
int DimH;
{
 int K, V, ii;

for (K = 0; K < DimV; K++)
  for (V = 0; V < DimH; V++)
    {
    Ord[PosDot[K][V]].v = K;
    Ord[PosDot[K][V]].h = V;
    }
  for (ii = 1; ii < DimV * DimH; ii++)
   {
   Ord[ii].v -= Ord[0].v;
   Ord[ii].h -= Ord[0].h;
   }
}

Point *AsignaCentros(Dv, Dh, DimV, DimH, ncentv, ncenth)
int Dv, Dh;
int DimV;
int DimH;
int *ncentv, *ncenth;
{
 Point *Cc;
 int K, V, ii;
 Size S;

*ncentv = Dv / DimV;
 *ncenth = (Dh / DimH) / 2;
 S = *ncentv * (*ncenth) * sizeof(Point);
 Cc = (Point *)NewPtr(S);
 Cc[0].v = (DimV - 1) / 2;
 Cc[0].h = (DimH - 1) / 2;
 ii = 0;
 for (K = 0; K < *ncentv; K++)
  for (V = 0; V < *ncenth; V++)
    {
    Cc[ii].v = Cc[0].v + K * DimV;
    Cc[ii++].h = Cc[0].h + DimH * (2 * V + K % 2);
    }
  return(Cc);
} void RandomizeCentros(Cc, Ccb, ncent, DimV, DimH, Amount, tt)
Point *Cc;
Point *Ccb;
int ncent;
```

```
  int DimV, DimH;
  float Amount;  /* porcentaje máximo de desplazamiento con respecto al radio */
  long *tt;
{
  int DCcid;
  int DCcab;
  int K;
  double Dv, Dh, Dv2, Dh2;

Dv = DimV * Amount;
  Dh = DimH * Amount;
  Dv2 = Dv * 2.0;
  Dh2 = Dh * 2.0;
  if (*tt < 0)
   *tt = TickCount();
  srand(*tt);
  for (K = 0; K < ncent; K++)
   {
   DCcid = floor((rand() / 32767.0) * Dh2 - Dh + 0.5);
   Cc[K].h += DCcid;
   Ccb[K].h -= DCcid;
   }
  for (K = 0; K < ncent; K++)
   {
   DCcab = floor((rand() / 32767.0) * Dv2 - Dv + 0.5);
   Cc[K].v += DCcab;
   Ccb[K].v -= DCcab;
   }
}

Connected(Dot, jj, K, V)
  Point *Dot;
  int jj;
  int K;
  int V;
{
  int j, d1, d2;

if (jj < 0)
   return 1;
  for (j = jj; j >= 0; j--)
   {
   d1 = abs(Dot[j].v - K);
   d2 = abs(Dot[j].h - V);
   if (d1 <= 1 && d2 <= 1)
    return 1;
   }
  return 0;
}
```

```
NextPos(Dot, Cc2, Cc, Ord, Dv, Dh, tt)
Point *Dot;
Point *Cc2, Cc, *Ord;
int Dv, Dh;
long tt;
{
 Cc2->v = Cc.v + Ord[tt].v;
 Dot->v = Cc2->v;
 Cc2->v = (Cc2->v >= Dv) ? Dv - Cc2->
v:
 Cc2->v;
 Cc2->v = (Cc2->v < 0) ? Dv + Cc2->
v:
 Cc2->v;
 Cc2->h = Cc.h + Ord[tt].h;
 Dot->h = Cc2->h;
 Cc2->h = (Cc2->h >= Dh) ? Dh - Cc2->
h:
 Cc2->h;
 Cc2->h = (Cc2->h < 0) ? Dh + Cc2->
h:
 Cc2->h;
} int CalculaMatrizUmbral(Rm, DimV, DimH, Dv, Dh, Rlevel, Seed)
int **Rm;
int DimV, DimH;
int Dv, Dh;
double Rlevel;
long *Seed;
{
 int K, V;
 int **PosDot, **TempM;
 int nn;    /* especificación de diametro punto virtual */
 Point *Cc, *Cc2, *Ord;
 Point *Ccb, *Cc2b;
 int *Ccu, *Ccub;
 int *Ccc, *Cccb;
 Point **Dot, **Dotb;
 Size S, Max;
 int ncentv, ncenth, DiaV, DiaH;
 int ii;
 long cnt;
 int OoR;

/* iniciación matriz de umbral      */
 for (K = 0; K < Dv; K++)
  for (V = 0; V < Dh; V++)
   Rm[K][V] = -1;
```

```
nn = Dv / DimV;
DiaV = DimV * nn + DimV % 2;
DiaH = DimH * nn + DimH % 2;
Max = DiaH * DiaV;
PosDot = imatrix(0, DiaV - 1, 0, DiaH - 1);
TempM = imatrix(0, DiaV - 1, 0, DiaH - 1);
CalculaCuadranteRoundDot2(TempM, DiaH, DiaV);
CalculaRoundDot(TempM, PosDot, DiaH, DiaV);
free_imatrix(TempM, 0, DiaV - 1, 0, DiaH - 1);

/*    asigna    centros          */
Cc = AsignaCentros(Dv, Dh, DimV, DimH, &ncentv, &ncenth);
S = ncentv * ncenth * sizeof(Point);
Ccb = (Point *)NewPtr(S);
S = ncentv * ncenth * sizeof(int);
Ccu = (int *)NewPtr(S);
Ccub = (int *)NewPtr(S);
Ccc = (int *)NewPtr(S);
Cccb = (int *)NewPtr(S);
for (ii = 0; ii < ncentv * ncenth; ii++)
 {
 Ccu[ii] = 1;
 Ccub[ii] = 1;
 Ccc[ii] = 0;
 Cccb[ii] = 0;
 }
for (ii = 0; ii < ncentv * ncenth; ii++)
 {
 Ccb[ii].v = Cc[ii].v;
 Ccb[ii].h = (Cc[ii].h + DimH < Dh) ? Cc[ii].h +
DimH:
(DimH - 1) / 2;
 }
RandomizeCentros(Cc, Ccb, ncentv * ncenth, DimV, DimH, Rlevel, Seed);
S = ncentv * ncenth * sizeof(Point);
Cc2 = (Point *)NewPtr(S);
Cc2b = (Point *)NewPtr(S);
Dot = dotmatrix(0, ncentv * ncenth - 1, 0, DimV * DimH * 2);
Dotb = dotmatrix(0, ncentv * ncenth - 1, 0, DimV * DimH * 2);
for (K = 0; K < ncentv * ncenth; K++)
 {
 Cc[K].v = (Cc[K].v < Dv) ? Cc[K].
v:
Dv - Cc[K].v;
 Cc[K].v = (Cc[K].v >= 0) ? Cc[K].
v:
Dv + Cc[K].v;
 Cc[K].h = (Cc[K].h < Dh) ? Cc[K].
h:
Dh - Cc[K].h;
 Cc[K].h = (Cc[K].h >= 0) ? Cc[K].
```

```
        h:
        Dh + Cc[K].h;
    Cc2[K] = Dot[K][0] = Cc[K];
}
for (K = 0; K < ncentv * ncenth; K++)
{
    Ccb[K].v = (Ccb[K].v < Dv) ? Ccb[K].
v :
        Dv - Ccb[K].v;
    Ccb[K].v = (Ccb[K].v >= 0) ? Ccb[K].
v :
        Dv + Ccb[K].v;
    Ccb[K].h = (Ccb[K].h < Dh) ? Ccb[K].
h :
        Dh - Ccb[K].h;
    Ccb[K].h = (Ccb[K].h >= 0) ? Ccb[K].
h :
        Dh + Ccb[K].h;
    Cc2b[K] = Dotb[K][0] = Ccb[K];
}
S = DimV * DimH;
S = S * (nn + DimV % 2) * (nn + DimH % 2);
S = S * sizeof(Point);
Ord = (Point *)NewPtr(S);
AsignaOrden(PosDot, Ord, DiaV, DiaH);
free_imatrix(PosDot, 0, DiaV - 1, 0, DiaH - 1);

cnt = Dv * Dh;
while(cnt)
{
    for (ii = 0; ii < ncentv * ncenth; ii++)
    {
        if  (Ccu[ii])
        {
            OoR = NextEmptyPos(Rm, &Dot[ii][Ccc[ii]], &Cc2[ii], Cc[ii],
                Ord, Dv, Dh, Max);
            if (!OoR
                && Connected(Dot[ii], Ccc[ii] - 1, Dot[ii][Ccc[ii]].v,
                    Dot[ii][Ccc[ii]].h))
            {
                Rm[Cc2[ii].v][Cc2[ii].h] = (Ccc[ii] >= DimV * DimH - 1)
                    ? DimV * DimH - 1 : Ccc[ii];
                cnt--;
                Ccc[ii]++;
                NextPos(&Dot[ii][Ccc[ii]], &Cc2[ii], Cc[ii], Ord, Dv, Dh,
                    (long)Ccc[ii]);
```

```
      } else
       Ccu[ii] = 0;
       }
      if (Ccub[ii])
       {
       OoR = NextEmptyPos(Rm, &Dotb[ii][Cccb[ii]], &Cc2b[ii],
            Ccb[ii], Ord, Dv, Dh, Max);
       if (!OoR
        && Connected(Dotb[ii], Cccb[ii] - 1, Dotb[ii][Cccb[ii]].v,
            Dotb[ii][Cccb[ii]].h))
        {
        Rm[Cc2b[ii].v][Cc2b[ii].h] = (Cccb[ii] >= DimV * DimH)
         ? DimV *
         DimH:
         DimV * DimH * 2 - Cccb[ii] - 1;
          cnt--;
         Cccb[ii]++;
        NextPos(&Dotb[ii][Cccb[ii]], &Cc2b[ii], Ccb[ii], Ord, Dv,
           Dh, (long)Cccb[ii]);
       } else
        Ccub[ii] = 0;
        }
      }
 }
 DisposPtr((Ptr)Cc);
 DisposPtr((Ptr)Cc2);
 DisposPtr((Ptr)Ccb);
 DisposPtr((Ptr)Cc2b);
 DisposPtr((Ptr)Ccu);
 DisposPtr((Ptr)Ccub);
 DisposPtr((Ptr)Ccc);
 DisposPtr((Ptr)Cccb);
 DisposPtr((Ptr)Ord);
 free_dotmatrix(Dot, 0, ncentv * ncenth - 1, 0, DimV * DimH - 1);
 free_dotmatrix(Dotb, 0, ncentv * ncenth - 1, 0, DimV * DimH - 1);
 return 0;
}

NextEmptyPos(Rm, Dot, Cc2, Cc, Ord, Dv, Dh, Max)
int **Rm;
Point *Dot;
Point *Cc2, Cc, *Ord;
int Dv, Dh;
```

/**** Spot Functions to Execute Preferred Embodiment in PostScript *****/

```
/spotAc  % cyan spot function
 {
 exch 1.0 add dup 1.0 gt {2 sub} if exch
 -1.0 add dup -1.0 lt {2 add} if abs exch abs 2 copy add 1 le
 {dup mul exch dup mul add 1 exch sub}
 {1 sub dup mul exch 1 sub dup mul add 1 sub}
 ifelse
 }def /spotAm  % magenta spot function
 {
 exch 1.0 add dup 1.0 gt {2 sub} if exch abs exch abs 2 copy add 1 le
 {dup mul exch dup mul add 1 exch sub}
 {1 sub dup mul exch 1 sub dup mul add 1 sub}
 ifelse
 }def /spotAa  % yellow spot function
 {
 -1.0 add dup -1.0 lt {2 add} if abs exch abs 2 copy add 1 le
 {dup mul exch dup mul add 1 exch sub}
 {1 sub dup mul exch 1 sub dup mul add 1 sub}
 ifelse
 }def /spotAn  % black spot function
 {
 abs exch abs 2 copy add 1 le
 {dup mul exch dup mul add 1 exch sub}
 {1 sub dup mul exch 1 sub dup mul add 1 sub}
 ifelse
 }def
```

- 1 -

APPENDIX B

What is claimed is:

1. A method of producing color reproductions using multiple half-tone screens for printing each of at least three basic colors, comprising the steps of:

(a) scanning in a predetermined pattern the color original that is being reproduced;
   (b) sensing along the scanning pattern the light intensity of each of the three basic color frequencies in a sequence of pixel areas of the color original;
   (c) converting the level of light intensity at each basic color frequency for each pixel area scanned to a set of numerical light intensity values representing the desired levels of color intensity of such color;
   (d) generating and storing a screen color matrix for each half-tone screen, each screen color matrix comprising a set of intensity level numerical values for its particular color in increments going from zero to maximum color intensity, the values being arranged in a different predetermined positional pattern for each screen color matrix;
   (e) creating each half tone screen from a corresponding screen color matrix by dividing each half-tone screen area into a plurality of cells, each cell being formed as a binary matrix of elemental areas that are selectively either clear or opaque, assigning each of the numerical values from the set of numerical values of the screen color matrix for the corresponding half-tone screen to a corresponding one of the elemental areas in the corresponding half-tone screens being created;
   (f) setting the binary values for the elemental areas for each half-tone screen to one binary value or the other depending on whether the numerical intensity level value for the corresponding elemental area is greater or lesser than the value stored in the screen function matrix; and
   (g) creating the color reproduction from the half-tone screens by positioning the half-tone screens to superimpose the basic colors over each other in partially overlapping fashion at the same screen angle.

2. The method of claim 1 wherein the positions of the numerical values within each screen function matrix are fixed such that for any given intensity level value the resulting elemental areas of the same binary value are positioned in symmetrical groups of contiguous elemental areas when combined with adjacent cells of the resulting screen.

3. The method of claim 2 wherein the spacing between the elemental area groups within each resulting screen is substantially equal.

4. The method of claim 3 wherein with the screens superimposed the spacing between elemental area groups associated with each of the different basic colors is substantially equal.

5. The method of claim 1 wherein the step of converting includes converting the light intensity levels at the basic color frequencies into four basic colors to be printed.

6. The method of claim 5 wherein the step of generating and storing includes the steps of generating and storing four screen function matrices, the two lowest intensity values for a first one of the screen function matrices being approximately positioned in the center and one corner, for a second one of the screen function matrices at the centers of two adjacent edges, for a third one of the screen function matrices at the centers of two diagonal quadrants, and for a fourth one of the screen function matrices at the centers of the remaining two diagonal quadrants.

7. The method of claim 6 wherein the step of generating and storing each of said four matrices includes the step of positioning the values of successively higher light intensity levels in contiguous positions surrounding the two lowest intensity values.

8. A method of producing a color reproduction from a plurality of half-tone screens in which each screen controls the pattern for one basic color, the method comprising the steps of:

generating and storing a plurality of color intensity level values representing the desired levels of color intensity for each basic color in a respective plurality of pixel areas of an image to be reproduced;
   generating and storing a plurality of screen function matrices, one matrix for each half-tone screen, each screen function matrix comprising a set of intensity level numerical values in increments going from zero to maximum color intensity, the intensity level numerical values being arranged in a different predetermined positional pattern for each screen function matrix;
   creating each half-tone screen by dividing each half-tone screen area into a plurality of cells, each cell being formed as a binary matrix of elemental areas that are selectively either clear or opaque, assigning to each of said cells the set of intensity level numerical values of the screen function matrix for the half-tone screen being created;
   for each half-tone screen, comparing the color intensity level value for each pixel area of the half-tone screen being crated with each of the intensity level numerical values in the corresponding screen function matrix, the binary value for each elemental area being set to tone or the other depending on whether the intensity level numerical value is greater or less than the compared color intensity level value; and
   creating the color reproduction from the half-tone screens including positioning the half-tone screens to superimpose the basic colors over each other in partially overlapping fashion at the same screen angle.

9. The method of claim 8 wherein the positions of the intensity level values within each screen function matrix are fixed such that for any given intensity level being compared the resulting elemental areas of the same binary value are positioned in symmetrical groups of contiguous elemental areas when combined with adjacent cells of the resulting screen.

10. The method of claim 9 wherein the spacing between the groups of contiguous elemental areas within each resulting screen is substantially equal.

11. The method of claim 10 wherein, with the screens superimposed, the spacing between elemental area groups associated with each of the different basic colors is substantially equal.

12. An apparatus for producing half-tone screens for use in color printing in which each screen controls the print pattern for each of a plurality of basic colors, said apparatus comprising:

means for generating and storing a plurality of sets of numerical values, each set of numerical values representing the levels of intensity for one of the plurality of basic colors in a respective one of a plurality of pixel areas of an image to be reproduced;

means for storing a plurality of numerical screen function matrices, one matrix for each half-tone screen, each matrix comprising a set of intensity level values in increments going from zero to maximum color intensity, the intensity level values being arranged in a different predetermined positional pattern for each screen function matrix;

means for plotting each half-tone screen including stylus means for creating a binary dot in incremental areas of each half-tone screen and means for positioning the stylus means at any of the incremental areas; and control means for the plotting means, said control means dividing the half-tone screen being plotted into a plurality of cells, each cell comprising a binary matrix of binary dots of the stylus, there being one dot in the binary matrix for each position in the screen function matrix, the control means setting the binary value of the stylus means by comparing the intensity level value in the corresponding position in the screen function matrix with the desired intensity level from the means for generating and storing a plurality of sets of numerical values to produce areas of color in the cells of the screens in partially overlapping fashion at the same screen angle.

13. The apparatus claimed in claim 12 wherein the the numerical screen function storing means includes means for positioning the numerical values within each screen function matrix such that the predetermined positioned pattern for each screen function matrix are in symmetrical groups.

14. The apparatus claimed in claim 12 wherein the generating and storing means includes means for storing a set of numerical values for black representing the desired level of intensity for black in the pixel areas, and the numerical screen function storing means arrange the two lowest intensity values for a first one of the screen function matrices in the center and one corner, for a second one of the screen function matrix at the centers of two adjacent edges, for a third one of the screen function matrices at the centers of two diagonal quadrants, and for a fourth one of the screen function matrices at the centers of the remaining two diagonal patterns.

15. The apparatus claimed in claim 13 wherein the numerical screen function storing means includes means for positioning the values of successively higher light intensity levels in contiguous positions surround the two lowest intensity values.

16. A method of producing a plurality of half-tone screens for color separation printing, one screen being produced for each of a plurality of colors, the method comprising:

generating a first set of numerical values for a first color, the first set representing levels of intensity of the first color in a plurality of rectilinear pixel areas of an image to be printed;

creating on a first screen for the first color a plurality of spots related in number and position to the pixel areas and related in size to the intensity levels of the first color in the respective pixel areas;

generating a second set of numerical values for a second color, the second set representing levels of intensity of the second color in the pixel areas of the image to be printed;

creating on a second screen for the second color a plurality of spots related in number and position to the pixel areas and related in size to the intensity levels of the second color in the respective pixel areas, the spots in the respective pixel areas on the second screen being shifted rectilinearly from the spots on the first screen and overlapping therewith at some intensity levels;

generating one or more additional sets of numerical values for one or more additional colors, each additional set representing levels of intensity of the corresponding additional color in the pixel areas of the image to be printed; and creating on each of one or more additional screens for the respective one or more additional colors a plurality of spots related in number and position to the pixel areas and related in size to the intensity levels of the corresponding additional color in the respective pixel areas, the spots in the respective pixel areas on each additional screen being shifted rectilinearly from each other and from the spots on the first and second screens and overlapping therewith at some intensity levels.

17. The method of claim 16, in which each spot has two centers, is split into two parts below a given intensity level and is merged into a single part above the given intensity level.

18. The method of claim 17, in which the spots on the second screen are shifted horizontally from the spots on the first screen by fifty percent of the pixel spacing and are unshifted vertically from the spots on the first screen.

19. The method of claim 18, in which the one or more additional sets comprise a third set and a fourth set, the one or more additional colors comprise a third color and a fourth color, and the one or more additional screens comprise a third screen and a fourth screen.

20. The method of claim 19, in which the spots on the third screen are shifted horizontally from the spots on the second screen by twenty five percent of the pixel spacing and are shifted vertically from the spots on the first and second screens by twenty five percent of the pixel spacing.

21. The method of claim 20, in which the spots on the fourth screen are shifted horizontally from the spots on the first screen by twenty-five percent of the pixel spacing, and shifted vertically from the spots on the first screen by twenty five percent of the pixel spacing.

22. The method of claim 16, in which the spots in the respective pixel areas on the screens overlap with each other at high intensity levels.

23. The method of claim 16, in which the spots in the respective pixel areas on the screens overlap with each other at intensity levels above 50%.

24. A method of producing a half-tone color separation image on a display surface, the method comprising the steps of:

generating a first set of numerical values for a first color, the first set representing levels of intensity of the first color in a plurality of rectilinear pixel areas of a master image to be produced;

creating on the display surface a plurality of spots of the first color related in number and position to the pixel areas and related in size to the intensity levels of the first color in the respective pixel areas of the master image;

generating a second set of numerical values of a second color, the second set representing levels of intensity of the second color in the pixel areas of the master image;

creating on the display surface a plurality of spots of the second color related in number and position to the pixel areas and related in size to the intensity levels of the second color in the respective pixel areas of the master image, the spots of the second color in the respective pixel areas being shifted rectilinearly from the spots of the first color and overlapping therewith at some intensity levels;

generating one or more additional sets of numerical values for one or more additional colors, each additional set representing levels of intensity of the corresponding additional color in the pixel areas of the master image; an creating on the display surface a plurality of spots related in number and position to the pixel areas and related in size to the intensity levels of the corresponding additional color in the respective pixel areas of the master image, the spots of each additional color in the respective pixel areas being shifted rectilinearly from each other and from the spots of the first and second colors and overlapping therewith at some intensity levels.

25. The method of claim 24, in which the display surface is a sheet of paper.

26. The method of claim 24, in which the master image is in the form of graphical information generated by a computer.

27. The method of claim 24, in which the master image is in the form of a color picture.

28. The method of claim 24, in which the spots of the first color are shifted horizontally from the spots of the second color and the spots of one additional color are shifted vertically from the spots of the first and second colors.

29. The method of claim 26, in which the spots of the first color are shifted vertically from the spots of the second color and the spots of one additional color are shifted horizontally from the spots of the first and second colors.

30. The method of claim 24, in which each spot has two centers, is split into two parts below a given intensity level and is merged into a single part above the given intensity level.

31. The method of claim 30, in which the spots of the second color are shifted horizontally from the spots of the first color by fifty percent of the pixel spacing and are unshifted vertically from the spots of the first color.

32. The method of claim 31, in which the one or more additional sets comprise a third set and a fourth set and the one or more additional colors comprise a third color and a fourth color.

33. The method of claim 32, in which the spots of the third color are shifted horizontally from the spots of the second color by twenty five percent of the pixel spacing and are shifted vertically from the spots of the first and second colors by twenty five percent of the pixel spacing.

34. The method of claim 33, in which the spots of the fourth color are shifted horizontally from the spots of the first color by twenty five percent of the pixel spacing and shifted vertically from the spots of the first color by twenty five percent of the pixel spacing.

35. The method of claim 24, in which the spots in the respective pixel areas of the colors overlap with each other at high intensity levels.

36. The method of claim 24, in which the spots in the respective pixel areas of the colors overlap with each other at intensity levels above 50%.

* * * * *